(No Model.)
C. H. WATSON.
WATER GATE.
No. 496,239. Patented Apr. 25, 1893.
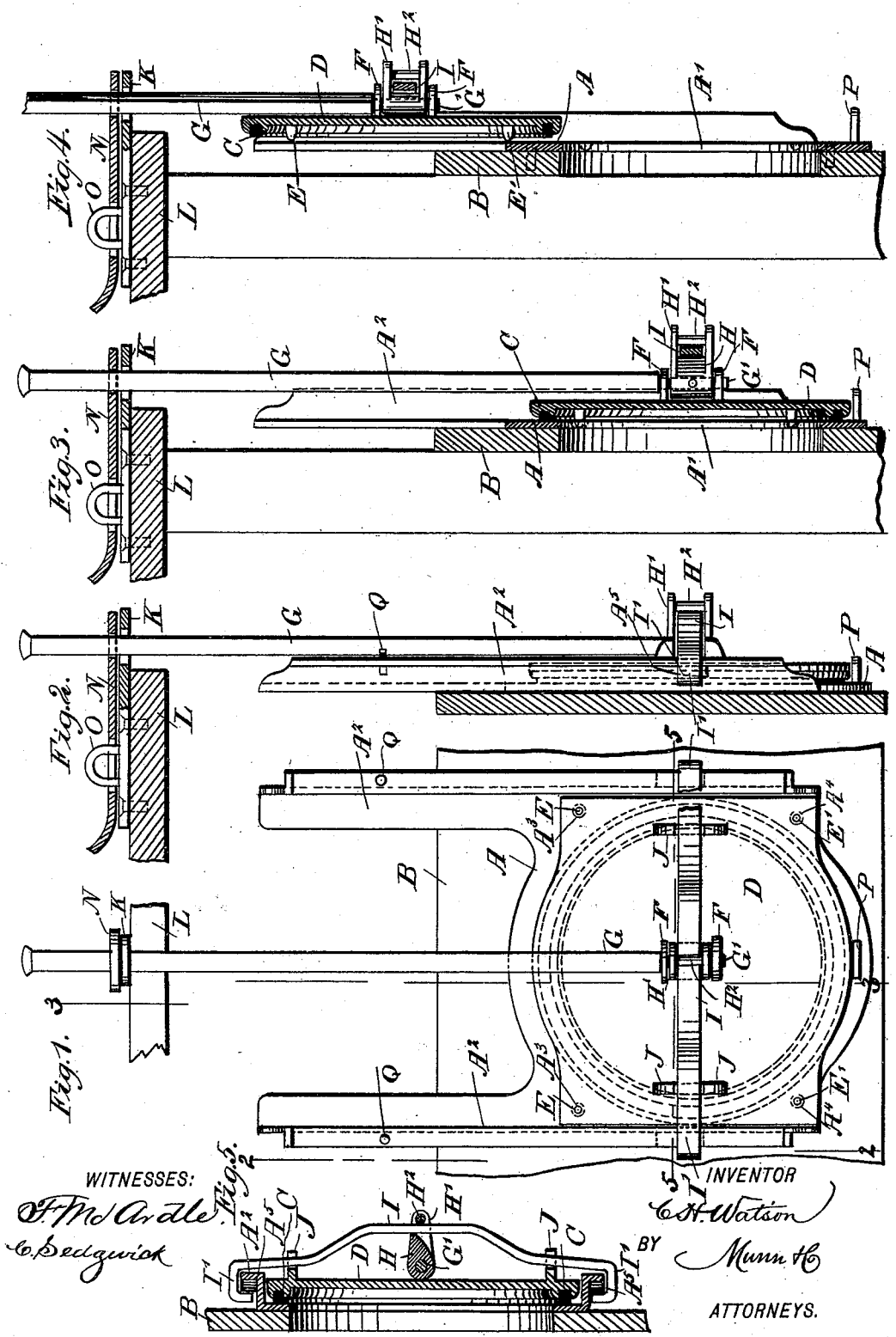

UNITED STATES PATENT OFFICE.

CHRISTOPHER H. WATSON, OF RIVERSIDE, CALIFORNIA.

WATER-GATE.

SPECIFICATION forming part of Letters Patent No. 496,239, dated April 25, 1893.

Application filed January 18, 1893. Serial No. 458,765. (No model.)

*To all whom it may concern:*

Be it known that I, CHRISTOPHER H. WATSON, of Riverside, in the county of San Bernardino and State of California, have invented a new and Improved Water-Gate, of which the following is a full, clear, and exact description.

The object of the invention is to provide a new and improved water gate, which is simple and durable in construction, easily manipulated for opening and closing the same, and arranged to prevent all leakage, by firmly seating and locking the gate over the opening.
The invention consists of a gate mounted to slide, and a gate stem carrying the gate and adapted to be turned, and pressed on by a spring.

The invention also consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a face view of the improvement with part broken out. Fig. 2 is a transverse section of the same on the line 2—2 of Fig. 1.
Fig. 3 is a like view of the same on the line 3—3 of Fig. 1. Fig. 4 is a similar view of the same in a different position; and Fig. 5 is a sectional plan view of the same on the line 5—5 of Fig. 1.
The improved water gate is provided with the gate plate A having the usual opening A' connecting with the pipe or flume on which the gate is applied. The plate A is secured in the usual manner to the end B of the pipe or flume and on the front face of the said plate is adapted to be seated the gasket C made of rubber or other suitable material and held on the inner face of the gate proper D mounted to slide vertically in suitable guideways A² forming part of the plate A. When the gate D is in a lowermost position it is adapted to be pressed longitudinally, so that the gasket C seats itself firmly on the plate A, whereby the opening A' in the gate plate A is closed, and all leakage is prevented. On the inner face of the gate D and near the upper end of the same are secured lugs E adapted to fit in recesses A³ formed on the front face of the gate plate A. A like set of lugs E' is arranged on the lower end of the gate D and is adapted to engage corresponding recesses A⁴ also formed on the plate A but out of vertical alignment with the other recesses A³, so that in pulling the gate D upward, the lugs E' do not engage the recesses A³.

In order to impart a vertical sliding movement to the gate D, I hang the same on a gate stem G formed at its lower end with a reduced part G' mounted to turn in suitable bearings F formed or projecting from the front face of the gate D. On this reduced portion G' of the stem G is secured a cam H adapted to be pressed on by a spring I preferably made of a piece of flat steel and extending transversely across the gate D, to engage with its bent ends I', the outer ends of the guideways A², as plainly shown in the drawings, especially with reference to Fig. 5.

In order to hold the spring I in the proper position on the gate D and to permit a compression of the same, I provide guideways J secured on the gate D and through which passes loosely the said spring I. In order to hold the cam H in contact at all times with the spring I, I provide the said cam with arms H' extending along the top and bottom edge of the spring I and connected with each other at their outer ends by a pin H² adapted to engage the outer face of the spring I. The bent ends I' of the spring I are adapted to engage wedges A⁵ formed on the guideways A² opposite the center of the opening A', so that when the gate D is in a closed position, as illustrated in Figs. 1, 2 and 3, the said ends I' engage the wedges A⁵ to hold the spring I taut. Now, when the stem G is turned, the cam H swings outward and presses against the inner side of the spring I, so that the force of the latter exerts a pressure on the gate D so as to securely press the same with its gasket C onto the face of the gate plate A over the opening A'. It is understood that this movement of the gate D can readily take place as the pins or lugs E and E' now move in the recesses A³ and A⁴. The upper end of the stem G is loosely guided in a keeper K secured to a transverse beam L forming part of the flume or gate-way and the said stem is also engaged loosely by a lever N for conveniently turning the said stem to impart a swinging motion to the cam H to engage the latter with the spring as above described, so as to firmly seat the gate D on the plate A. When the cam H is swung outward, as illustrated in Fig. 5, then the lever N extends longitudinally and is adapted to be locked on a staple O projecting from the keeper K and adapted to engage an aperture in the said lever. The stem G is preferably made square and passes through a corresponding aperture in the lever N so that the gate can be raised and lowered without moving the lever N away from the top of the keeper K. The downward sliding motion of the gate D is limited by a stop P projecting from the plate A and the upward movement of the gate is limited by stop pins Q secured on the guideways $A^2$ and adapted to be engaged by the bent ends I' of the spring I, thus forming a stop for the gate D. It is understood that when the cam H is swung transversely, the spring I engaging the pin $H^2$ moves the gate D off the plate A sufficiently for the inner ends of the lugs E and E' to be clear of the front face of the plate A. Now, by raising the stem G in any suitable manner the gate D slides upward to free the opening A'. It will be seen that the gate D when pulled upward can be locked in any desired position by turning the stem G by the lever N or otherwise, so that the cam H swings outward and presses on the spring I. Now, it will be seen that the gate D is pressed inward toward the plate A, but the gasket C is not moved in contact with the face of the plate, but the lugs E and E' receive the contact pressure. By this arrangement the gasket is not injured in any manner while the gate is partly or wholly open, and the gasket is only used when the gate is entirely closed at the time the lugs E and E' register with their corresponding recesses $A^3$ and $A^4$.

Having thus fully described my invention, I claim as new and desire to secure by Letters Patent—

1. A water gate, comprising a gate mounted to slide vertically and adapted to be moved longitudinally, a gate stem carrying the gate, the said stem being adapted to be turned, a cam held on the said stem, and a spring adapted to be engaged by the said cam for pressing the said gate to its seat, substantially as shown and described.

2. A water gate, comprising a gate plate having recesses and provided with guideways, a gate mounted to slide in the said guideways, and provided with lugs adapted to engage the said recesses, and means, substantially as described, for pressing the said gate longitudinally to seat the same over the opening of the gate at the time the said lugs engage the said recesses, substantially as shown and described.

3. A water gate, comprising a gate plate having recesses and guideways, a gate having a gasket and mounted to slide on the said gate plate, lugs projecting from the said gate and adapted to engage the said recesses and the face of the gate plate, a gate stem carrying the said gate and mounted to turn, a cam held on the said stem, and a spring engaged by the said cam, and held on the said gate and engaging the said guideways, substantially as shown and described.

4. A water gate, comprising a gate plate having recesses and guideways, a gate having a gasket and mounted to slide on the said gate plate, lugs projecting from the said gate and adapted to engage the said recesses and the face of the gate plate, a gate stem carrying the said gate and mounted to turn, a cam held on the said stem, a spring engaged by the said cam, and held on the gate and engaging the said guideways, and wedges formed on the said guideways and adapted to be engaged by the bent ends of the said spring, substantially as shown and described.

5. A water gate, comprising a gate plate having recesses and guideways, a gate having a gasket and mounted to slide on the said gate plate, lugs projecting from the said gate and adapted to engage the said recesses and the face of the gate plate, a gate stem carrying the said gate and mounted to turn, a cam held on the said stem, a spring engaged by the said cam and held on the said gate and engaging the said guideways, and a pin supported from the said cam and engaging the spring on the side opposite the cam, substantially as shown and described.

CHRISTOPHER H. WATSON.

Witnesses:
A. G. MUNN,
JOHN G. LESLIE.